2,801,693

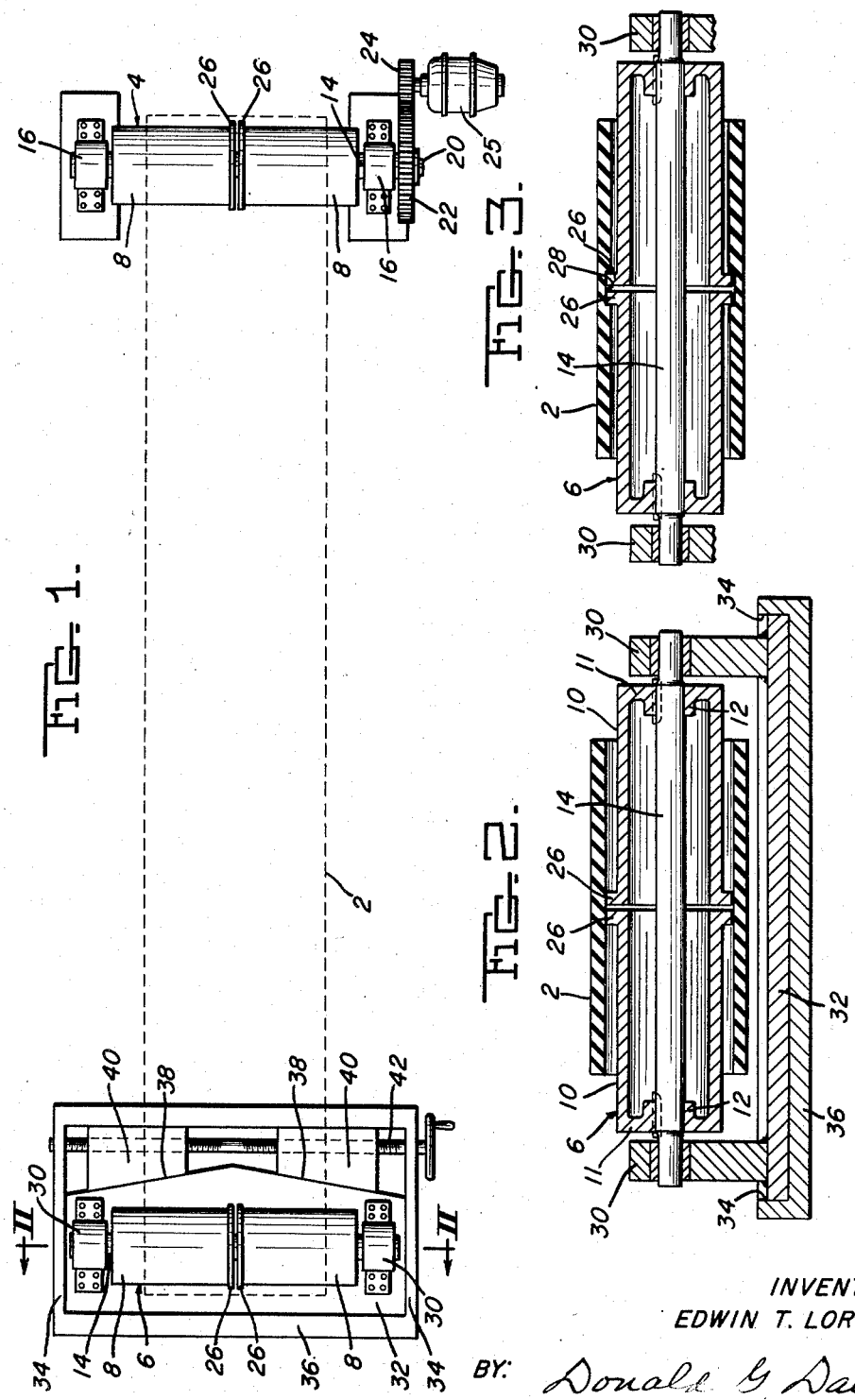

APPARATUS FOR MAKING AN ENDLESS BELT

Edwin T. Lorig, Pittsburgh, Pa., assignor to United States Steel Corporation, a corporation of New Jersey Application May 9, 1955, Serial No. 506,990

2 Claims. (Cl. 164—61)

This invention relates to apparatus for making endless belts and more particularly for making belts having a central internal groove therein as shown in my copending application, Serial No. 287,777, filed May 14, 1952, now abandoned. Such belts are ordinarily made from rubber, fabric or other materials having a low modulus of elasticity. However, they may also be made from metal. In order that the belt may function properly it is very desirable that the center groove be very accurate without deviation in width or in its location transversely of the belt. With the methods and apparatus now in use for providing such a groove it is extremely difficult to obtain such uniformity.

It is therefore an object of my invention to provide apparatus for making an endless belt with a central internal groove therein where the groove is readily formed without deviation in width or location transversely of the belt.

This and other objects will be more apparent after referring to the following specification and attached drawings, in which:

Figure 1 is a plan view of the apparatus of my invention;

Figure 2 is a view taken on the line II—II of Figure 1 and showing the belt prior to the forming of the groove; and Figure 3 is a fragmentary view, similar to Figure 2, showing a grove formed in the belt.

Referring more particularly to the drawings, reference numeral 2 indicates an endless belt which passes around spaced apart automatic centering and aligning rolls or pulleys 4 and 6. As shown each of the automatic centering pulleys is of the type disclosed in my Patent No. 2,593,158. However, these automatic centering pulleys may also be of the type disclosed in my prior Patent No. 2,593,157. Each of the automatic centering pulleys is made up of a pair of opposed roll sections 8, each of which consists of a rim portion 10 fastened by means of a web 11 to a hub portion 12 which is keyed to a rotatable shaft 14 so that the roll sections will rotate at the same angular velocity. The shaft 14 of pulley 4 is mounted in bearings 16 with one end extending beyond one of the bearings 16 in order to provide means for driving the roll. For example, a shaft extension 20 may have a gear 22 mounted thereon which is driven by means of a pinion 24 from a motor 25. The axes of the rim portions are either initially bent as in Patent No. 2,593,157 or will bend under load. At any event the axes of the rim portions under load diverge away from the direction of approach of the belt. A raised center ring or flange 26 is provided on the end of each roll section 8 adjacent the opposite roll section. The flanges 26 are made of a material harder than the belt and the combined widths of the flanges are substantially equal to the desired width of groove 28. The pulley 6 is mounted in spaced apart bearings 30 which in turn are mounted on a slidable platform 32 mounted in guides 34 on a base 36. The platform 32 is provided with tapered sides 38 which cooperate with wedges 40 mounted in the guides 34. Right and left hand screw 42 passes through threaded openings in the wedges 40 and by turning the screw 42 the distance between pulleys 4 and 6 may be varied. Means may also be provided for adjusting the axes of the pulleys 4 and 6 into substantial parallelism.

In operation the endless belt 2 without the central internal groove therein is placed around the rolls 4 and 6 so that the internal surface of the roll rests on the flanges 26, as shown in Figure 2. Tension is applied to the belt 2 by means of the wedge and screw adjusting mechanism 40 and 42. The roll 4 is then driven and the belt 2 will pass therearound and become centered on the flanges 26. The belt 2 has a differential speed with respect to the rolls 4 and 6 so that there is slippage therebetween. While the theory of operation is not completely understood the invention has been utilized both on metal and rubber to form grooves. At least some of the material of the belt is removed either by cutting or by wear and there may be some compacting of the material in the groove. As the groove 28 is gradually formed in the belt the forces causing the belt to remain centered increase. Because of the centering ability of the rolls 4 and 6 the groove 28 must be formed on the transverse center of the belt and be of uniform width regardless of variations in width of the belt. It is preferred to use the belt with the rolls which form the groove 28, the depth of the groove being limited by the height of flanges 26.

While one embodiment of my invention has been shown and described it will be apparent that other adaptations and modifications may be made without departing from the scope of the following claims.

I claim:

1. Apparatus for producing a central internal groove in an endless belt comprising a pair of spaced apart aligned automatic centering rolls arranged in substantial parallelism, each of said rolls having a pair of spaced rim portions mounted on a shaft, the axes of said rim portions being bent under load so that said axes diverge away from the direction of approach of the belt, means to rotate said rim portions on each roll at the same angular velocity, a raised flange on each rim portion on their adjacent ends made of a material harder than the belt, the combined width of the flanges being substantially equal to the desired width of groove, means for rotating one of said rolls, and means for applying tension to the belt whereby the flanges on said rim portions form a groove in the belt.

2. Apparatus for producing a central internal groove in an endless belt comprising a pair of spaced apart aligned automatic centering rolls arranged in substantial parallelism, each of said rolls having a pair of spaced rim portions mounted on a shaft, the axes of said rim portions being bent under load so that said axes diverge away from the direction of approach of the belt, means to rotate said rim portions on each roll at the same angular velocity, a raised flange on each rim portion on their adjacent ends made of a material harder than the belt, the combined width of the flanges being substantially equal to the desired width of groove, means for rotating one of said rolls, and means for moving one of said rolls away from the other roll to apply tension to the belt whereby the flanges on said rim portion form a groove in the belt.

References Cited in the file of this patent

UNITED STATES PATENTS

| | | |
|---|---|---|
| 1,233,647 | Coryell | July 17, 1917 |
| 1,648,938 | Dietrich | Nov. 15, 1927 |
| 2,352,675 | Yoder | July 4, 1944 |
| 2,429,119 | Bloomfield | Oct. 14, 1947 |
| 2,600,273 | Seifried | June 10, 1952 |
| 207,626 | Sargent | Sept. 3, 1878 |